UNITED STATES PATENT OFFICE.

GUSTAV MOLT, OF MILLBURY, MASSACHUSETTS.

IMPROVEMENT IN BLUE DYES.

Specification forming part of Letters Patent No. 179,939, dated July 18, 1876; application filed February 19, 1876.

*To all whom it may concern:*

Be it known that I, GUSTAV MOLT, of Millbury, in the county of Worcester and State of Massachusetts, have invented an Improvement in Dyeing with Indigo, of which the following is a specification:

My invention relates to the composition of the materials for the vat, and the use of them in coloring cotton or mixed cotton and wool.

To make the dye, take one pound of ground indigo, two pounds of caustic potash, and water sufficient to dissolve them, and heat to a boiling-point; then add two and one-half ($2\frac{1}{2}$) pounds of "oxalere," five (5) pounds of liquid ammonia, and two (2) pounds of sal-ammoniac. The addition of these "springs the indigo," and the compound may froth some, but will soon settle into a homogeneous liquor or blue dye, and may be used at once, or made in the same proportions with all parts, except the oxalere, and kept on hand, or shipped with the oxalere in a separate vessel, to be added in the proper quantities to prepare the amount of dye for use as wanted.

When used, a portion of the blue dye is taken and mixed with water, according to the color desired, (for instance, fifty gallons of water with the above amount of dye makes a very deep blue,) and, heating to 130°, (Fahrenheit,) the articles are dipped in the usual way, mixed cotton and wool, or clear cotton, taking a clear, even color.

The oxalere mentioned is an article of commerce. I am informed it is made by melting pure zinc until the fumes cease to rise, then washing, drying, and triturating the residue. Instead of the potash, ten (10) pounds of soda-ash might be used.

I claim—

The blue dye described, composed of indigo, oxalere, ammonia, sal-ammoniac, and potash or soda-ash, in the proportions substantially as above set forth.

GUSTAV MOLT.

Witnesses:
  DANL. BROWN,
  J. G. ARNOLD.